US005530798A

United States Patent [19]

Chu et al.

[11] Patent Number: 5,530,798

[45] Date of Patent: Jun. 25, 1996

[54] APPARATUS AND METHOD FOR CASCADING GRAPHIC PROCESSORS

[75] Inventors: Frank Chu, Hsinchu Hsien; Alex Tang, Hsinchu, both of Taiwan

[73] Assignee: United Microelectronics Corp., Taipei, Taiwan

[21] Appl. No.: 332,708

[22] Filed: Nov. 1, 1994

[51] Int. Cl.$^{6}$ .......... G06F 3/14

[52] U.S. Cl. .......... 395/163; 395/162

[58] Field of Search .......... 395/162, 163, 395/275, 325, 550, 775, 800; 364/200

[56] References Cited

U.S. PATENT DOCUMENTS 4,885,703 12/1989 Deering .......... 395/122

5,255,359 10/1993 Ebbers et al. .......... 395/161

5,371,514 12/1994 Lawless et al. .......... 345/145

*Primary Examiner*—Mark R. Powell

*Assistant Examiner*—U. Chuanhan

*Attorney, Agent, or Firm*—Curtis, Morris & Safford

[57] ABSTRACT

A cascaded apparatus of graphic processors for cascading a main graphic processor and at least one secondary graphic processor comprising a clock generator for generating the clock signal to control the timing and synchronize the all the actions; a pixel synchronizer for synchronizing the color codes and layer codes; a layer comparator for comparing the level of layer codes; a mode selector for selecting the mode; a cascade controller for comparing the layer and outputting the color codes; and a color code output device which determines the output of color codes.

18 Claims, 8 Drawing Sheets

APPARATUS AND METHOD FOR CASCADING GRAPHIC PROCESSORS

BACKGROUND OF THE INVENTION

The present invention relates generally to a cascaded apparatus and method of graphic processing.

In general, graphic processing capability is limited by the hardware platform, and if the hardware has been implemented, there is no room to enhance the capability of graphic processing. The prior art in this field normally cannot deal with more than two cascaded structures, or it cannot process the layers even if it can handle two cascaded structures. Consequently, it is impossible for prior art devices to handle special graphic patterns which are beyond their limits.

SUMMARY OF THE INVENTION

The primary object of the present invention is to provide room for expansion of graphic processing requirements which are beyond the hardware capability to handle.

Another object of this invention is to provide a method and apparatus to cascade graphic processors having different functions such that it is unnecessary to put all functions in one single chip.

Yet a further object of this invention is to provide a method and apparatus to cascade different graphic processors by cascading their graphic processing circuits in order to enhance the graphic processing capability of the entire system.

BRIEF DESCRIPTION OF DRAWINGS

The present invention can be more fully understood by reference to the following detailed description and accompanying drawings, which form the integral part of this application, and wherein.

DETAILED DESCRIPTION OF THE PREFERRED EMBODIMENT

Figure 1:
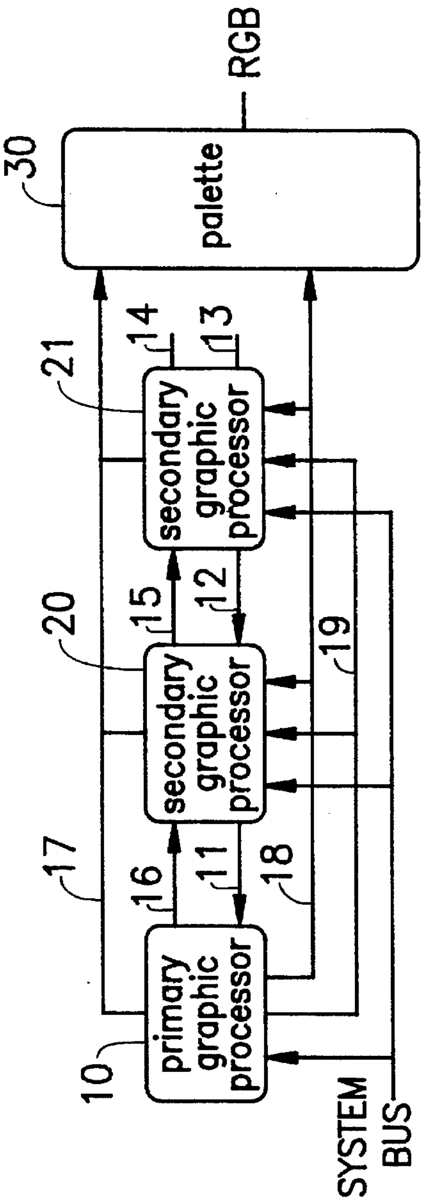
FIG. 1 is a cascaded signal-flow block diagram of this invention.

FIG. 1 shows a cascaded signal-flow block diagram which can have many different graphic processors cascaded in the manner according to this invention. Graphic processor 10 is assigned as the primary graphic processor, a graphic processor 20 as a first secondary graphic processor, and a graphic processor 21 as a second secondary graphic processor. Primary graphic processor 10 controls scan timing and synchronizing of the entire system. Graphic fields of depth are controlled by cascaded graphics layer codes 11, 12, 13, and the queuing order of the different graphic processors 10, 20, 21 is software-driven. When the graphic processors have the same graphic layer codes 11, 12, 13, the queuing order starts from the most upfront graphic processor (i.e. 10) to the last one (i.e. 21). Meanwhile, cascaded signals 14, 15, and 16 are used to control the output of each graphic processor's color code 17 to ensure the color codes of all graphic processors 10, 20, 21 output to the same bus 17, and also to ensure that the output color code is from only one graphic processor within a period of a pixel clock pulse. If the output color appeared at the bus 17 is merely a psuedo-code, then it needs a palette 30 to convert the pseudo-code into RGB signals.

In general, in order to make two different graphic processors process in a parallel manner, the problem of synchronization must be solved. In accordance with this invention, two heterogeneous sync signals are used to solve the synchronization problem for two heterogeneous graphic processors: a pixel sync signal 18 for synchronizing the output of color codes and layer codes, and a picture field sync signal 19 for synchronizing the scan clock. The initial values of each picture field can be set according to a signal which is related to the vertical blanking period of the picture field since each of the graphic processors will re-synchronize themselves after ending each picture field or before beginning each picture field. The pixel sync signal 18 and the picture field sync signal 19 are output by the primary graphic processor 10, and secondary graphic processors 20, 21 adjust their process timing according to these sync signals.

Figure 2:
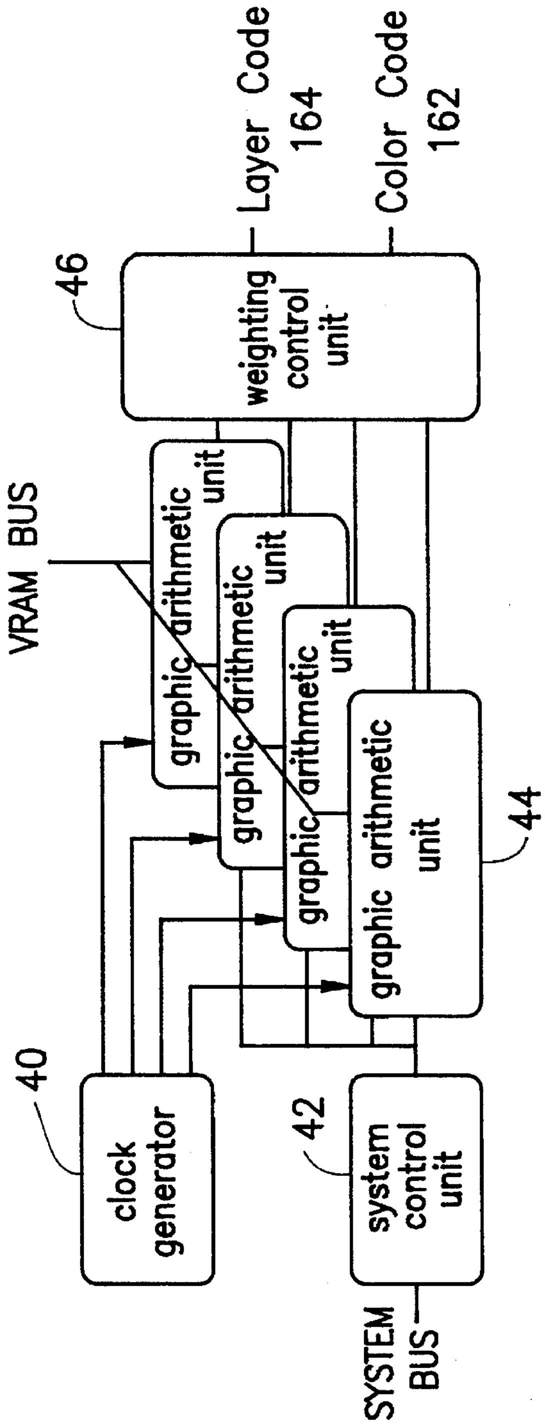
FIG. 2 is a signal-flow block diagram of a graphic processor according to this invention.

Referring now to FIG. 2, in general, the graphic processor of an arcade video game machine comprises the following parts: a clock generator 40 for generating the needed sync signals and control timing signals; a system control unit 42 for interfacing with a control system (not shown) to control the operation mode of a graphic processor; at least one graphic arithmetic unit 44 for converting the graphic parameters to the graphic color and illumination signal consistent with a scan clock; and a weighting control unit 46 for determining the order of outputting color codes when a plurality of graphic arithmetic units 44 exist. Then, the weighting control unit 46 outputs a layer code 164 and a color code 162, respectively.

Figure 3:
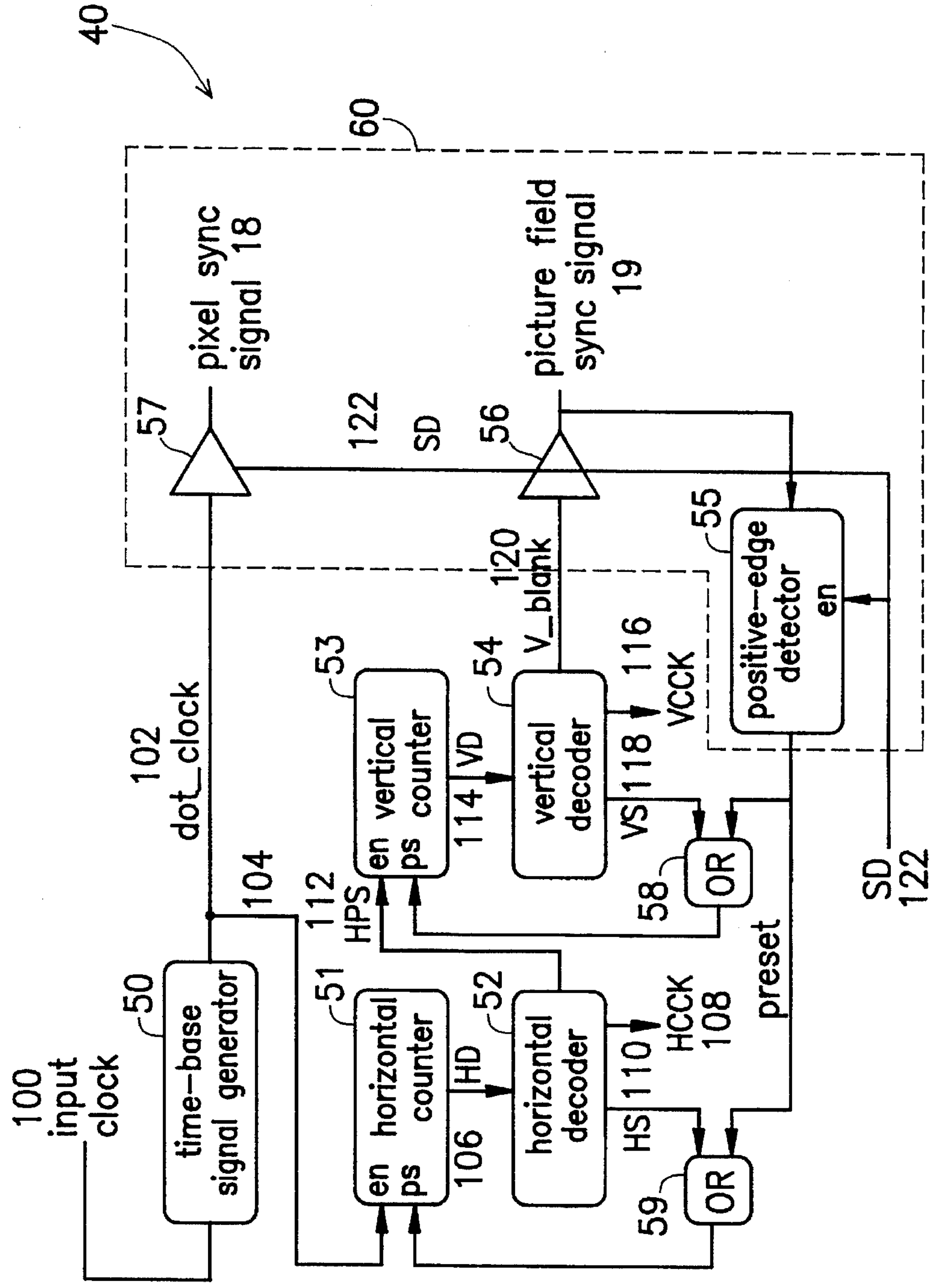
FIG. 3 is a schematic diagram of a clock generator.

According to this invention in FIG. 3, the clock generator 40 includes: a time-base signal generator 50 which receives an input clock signal 100 to generate a dot—clock 102; a horizontal counter 51 for computing time duration of horizontal scanning based on a clock signal 104 of time-base signal generator 50; a horizontal decoder 52 which receives counting data HD 106 from horizontal counter 51 and decodes HD 106 into a horizontal control clock HCCK 108 and a horizontal sync signal HS 110 that are needed by each graphic processor 10, 20, 21; a vertical counter 53 for computing time duration of a picture field based on a horizontal period signal HPS 112 output from the horizontal decoder 52; a vertical decoder 54 which receives counting data VD 114 from vertical counter 53 and decodes counting data VD 114 into a vertical control clock VCCK 116, a vertical sync signal VS 118, and a vertical blanking signal V-blank 120 that are needed by each graphic processor 10, 20, 21; a primary/secondary system synchronizer 60 which uses a primary/secondary system select signal SD 122 to determine which role a graphic processor 10, 20, 21 is to play in the entire system (for example, whether or not to output the dot_clock 102 and the vertical blanking signal V-blank 120 of vertical decoder 54). The primary/secondary system synchronizer 60 includes: a pixel sync signal I/O controller 57 which may be a tri-state I/O buffer for determining whether to output the dot_clock 102 generated by clock generator 50 as the pixel sync signal 18 or to input a pixel sync signal 18 from the primary graphic processor according to the primary/secondary system select signal SD 122, e.g., a graphic processor will be assigned to be a primary graphic processor while the primary/secondary system select signal SD 122 is at high level. Meanwhile, the tri-state I/O buffer 57 becomes an output device due to the high-level input signal SD 122 so that the primary graphic processor outputs the pixel sync signal 18 to the secondary graphic processors; a picture field sync signal I/O controller 56 which may be a tri-state I/O buffer for determining whether to output the vertical blanking signal V-blank 120 generated by the vertical decoder 54 as the picture field sync signal 19 or to input a picture field sync signal 19 from the primary graphic processor according to the primary/secondary system select signal SD 122 as described above; a positive-edge detector 55 which presets the initial values of the horizontal counter 51 and vertical counter 53 in each picture field by the positive edge of the vertical blanking signal V-blank 120. To preset horizontal and vertical initial values, two OR gates 58, 59 are utilized.

Figure 4:
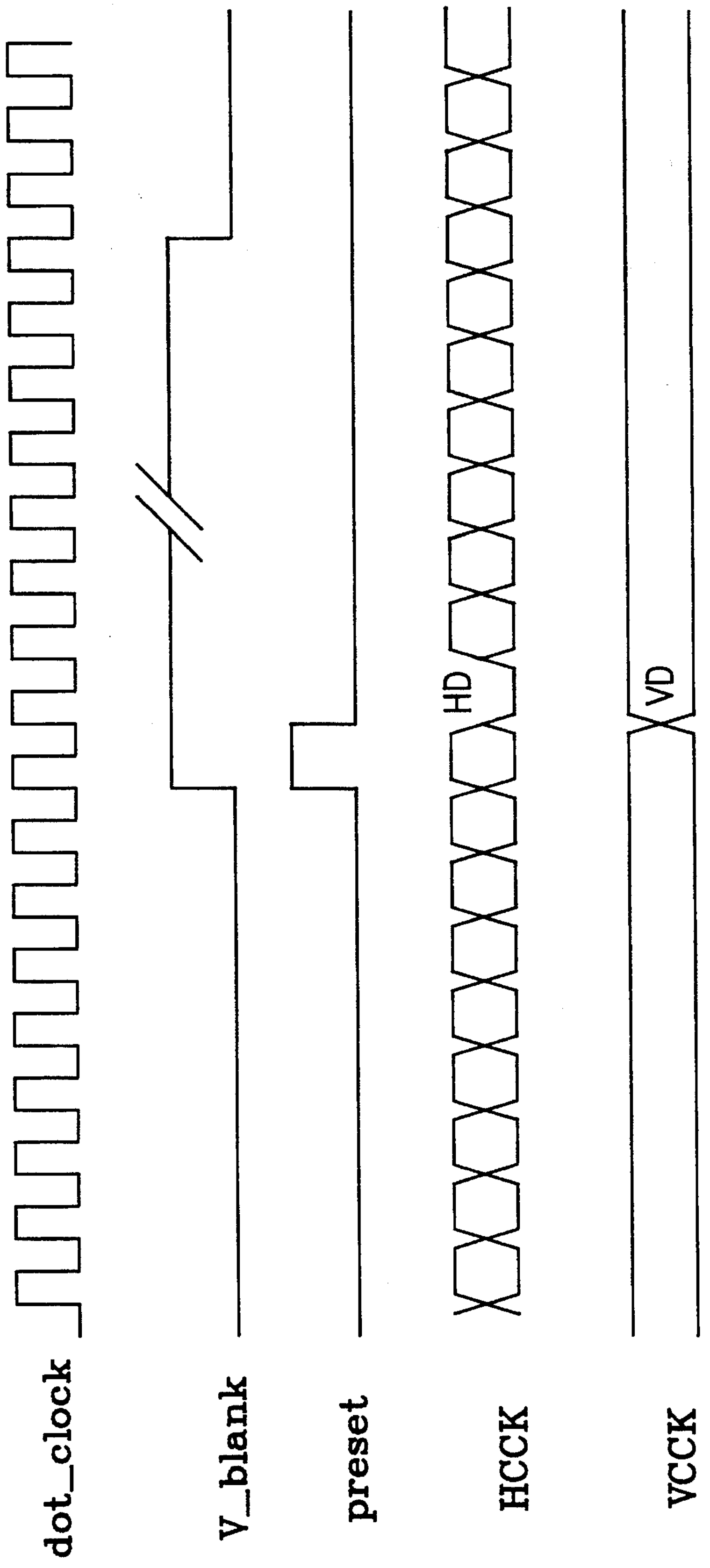
FIG. 4 is a timing diagram of signals within the clock generator.

FIG. 4 illustrates timing diagrams of various signals utilized in clock generator 40 shown in FIG. 3. When the primary graphic processor is in place, the pixel sync signal 18 and picture field sync signal 19 are output since both tri-state I/O buffers are activated by the high level signal (SD). On the other hand, when the secondary graphic processor is in place, the pixel sync signal 18 and picture field sync signal 19 are input from the primary processor since the tri-state I/O buffers are deactivated by a low level signal (SD). The pixel sync signal 18 is used to synchronize the output of the color codes in the layer comparison. The minimal time unit of each pixel within the primary graphic processor is the dot—clock generated therein.

Figure 5:
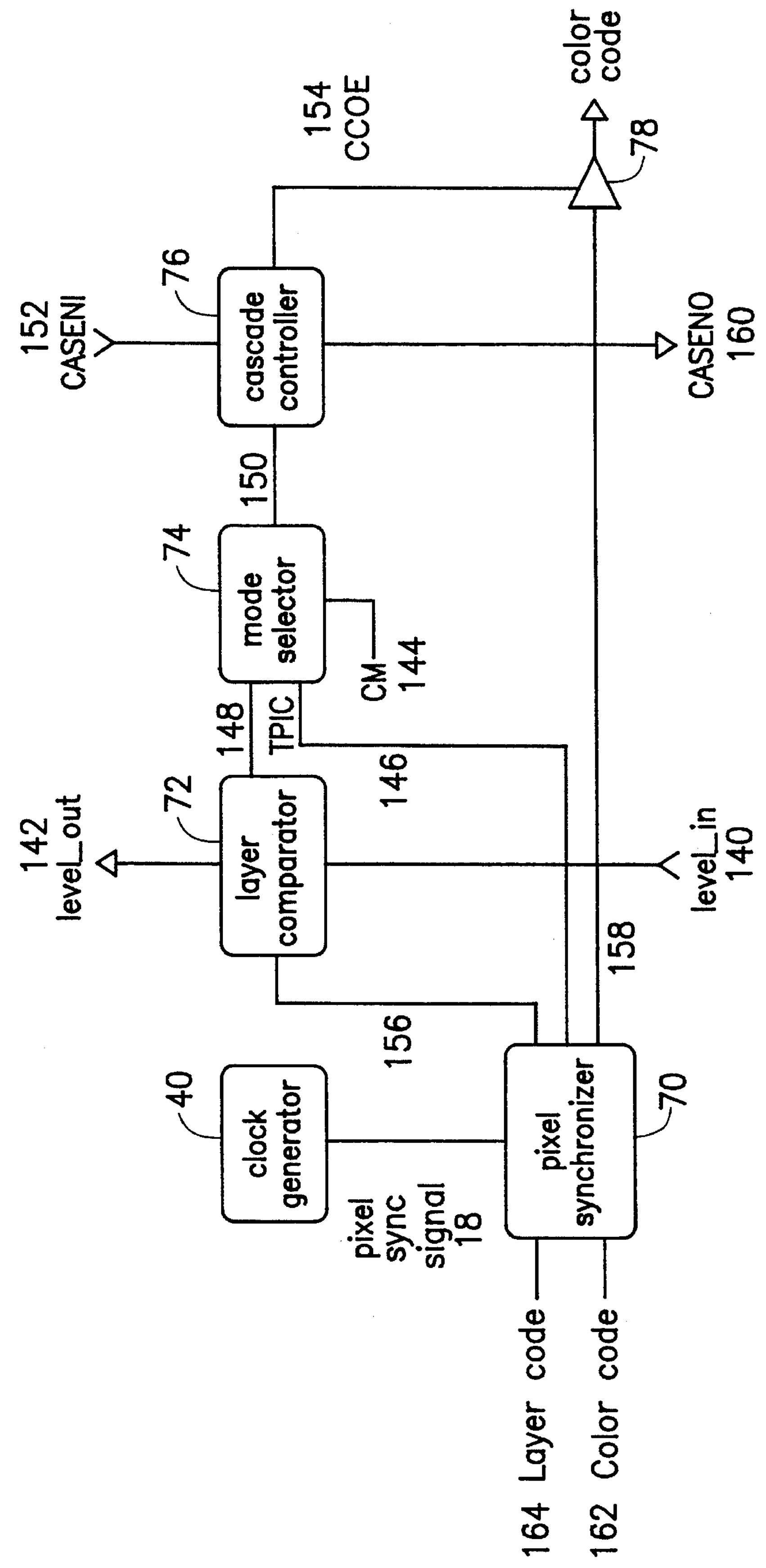
FIG. 5 is a system block diagram showing the cascaded infrastructure of this invention.

FIG. 5 shows the apparatus for cascading a plurality of graphic processors, dipicted in FIG. 2, to constitute the cascaded structure shown in FIG. 1 according to this invention. The apparatus can be placed after the weighting controller 46 of each graphic processor, no matter what is primary or secondary, for receiving the color code 162 and layer code 164. This cascaded structure includes: the clock generator 40, depicted in FIG. 3, for generating all graphic processing control clocks and sync signals, such as pixel sync signal 18 an picture field sync signal 19, to ensure the graphic processors synchronizing with the scan clock; a pixel synchronizer 70 which is made of a set of D-type flip-flops for synchronizing the color codes 162 and layer codes 164 of each graphic processor with the pixel sync signal 18 of the primary graphic processor; a layer comparator 72 for comparing the synchronized layer code 56 from the pixel synchronizer 70 with the level-in signal 140 that is, the layer code 13 for the second secondary graphic processor 21, the layer code 12 for the first secondary graphic processor 20, or the layer code 11 for the primary graphic processor 10, as exemplified in FIG. 1, and outputting the result as level-out 142 that is, the layer code 12 for the second secondary graphic processor 21, or the layer code 11 for the first secondary graphic processor 20, depicted in FIG. 1; a mode selector 74 which is controlled by a select signal CM 144 (further described below) for selecting between a layer code TPIC 146 output from the pixel synchronizer 70 or a compared result 148 output from the layer comparator 72; a cascade controller 76 which bases on the mode output 150 of the mode selector 74 and a signal CASEN1 152 that is, the cascaded signal 16 for the first secondary graphic processor 20, or the cascaded signal 15 for the secondary graphic processor 21, as depicted in FIG. 1, to control the output of color code of the corresponding graphic processor outputted or not, whereby a signal CASEN0 160, such as the cascaded signal 16 for the primary graphic processor 10, the cascaded signal 15 for the first secondary graphic processor 20, or the cascaded signal 14 for the second secondary graphic processor 21, as depicted in FIG. 1, is output to inform the code layer of the corresponding graphic processor being outputted or not; and a color code output device 78 which is a buffer controlled by an enabling signal CCOE 154 output from the cascade controller 76 to determine whether to output color codes or not.

Figure 6:
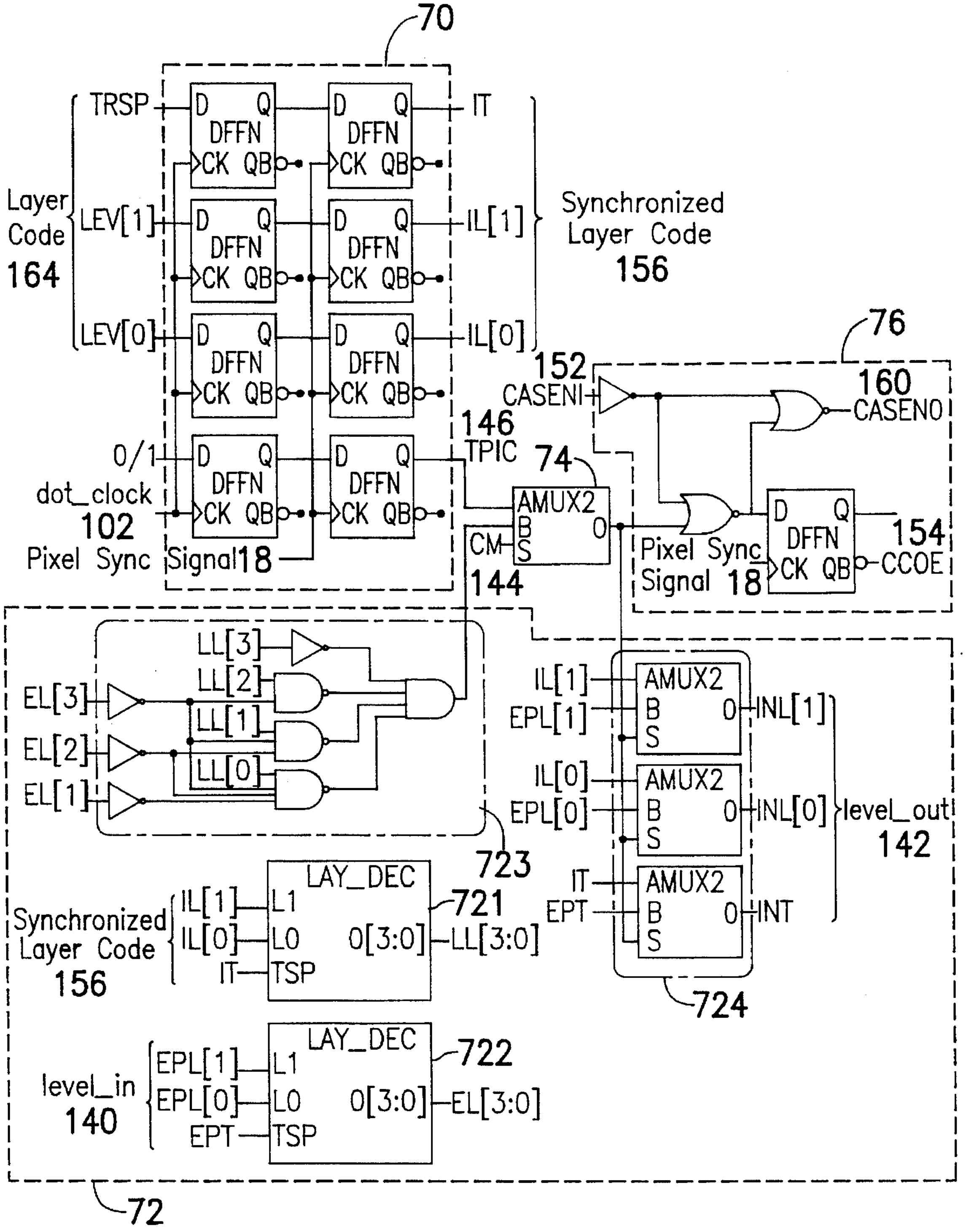
FIG. 6 is a schematic circuit diagram of the preferred embodiment according to this invention.

FIG. 6 is a detailed circuit of several of the elements consisting of the pixel synchronizer 70, the layer comparator 72, the mode selector 74, and the cascade controller 76 of the apparatus shown in FIG. 5. The circuit shown can process four levels of field of depth. The pixel synchronizer 70 may be constructed with two-stage D-type flip-flops. In the first stage D-type flip-flops, the clock terminals thereof are all controlled by the signal dot_clock 102 generated by the inherent clock generator 40 while the pixel sync 18 signal coming from the primary graphic processor serves as the clock signal for the flip-flops within the second stage. The layer comparator 72 includes: two sets of decoders 721, 722 for decoding the synchronized 156 layer code IL[0], IL[1], IT as the level_in 130 consisting of EPL[0], EPL[1], EPT, repectively. The table of decoded 421 and 722 is listed as follows:

| TSP | L1 | L0 | 0[3] | 0[2] | 0[1] | 0[0] |
|---|---|---|---|---|---|---|
| 0 | 0 | 0 | 1 | 0 | 0 | 0 |
| 0 | 0 | 1 | 0 | 1 | 0 | 0 |
| 0 | 1 | 0 | 0 | 0 | 1 | 0 |
| 0 | 1 | 1 | 0 | 0 | 0 | 1 |
| 1 | X | X | 0 | 0 | 0 | 0 |

Figure 7:
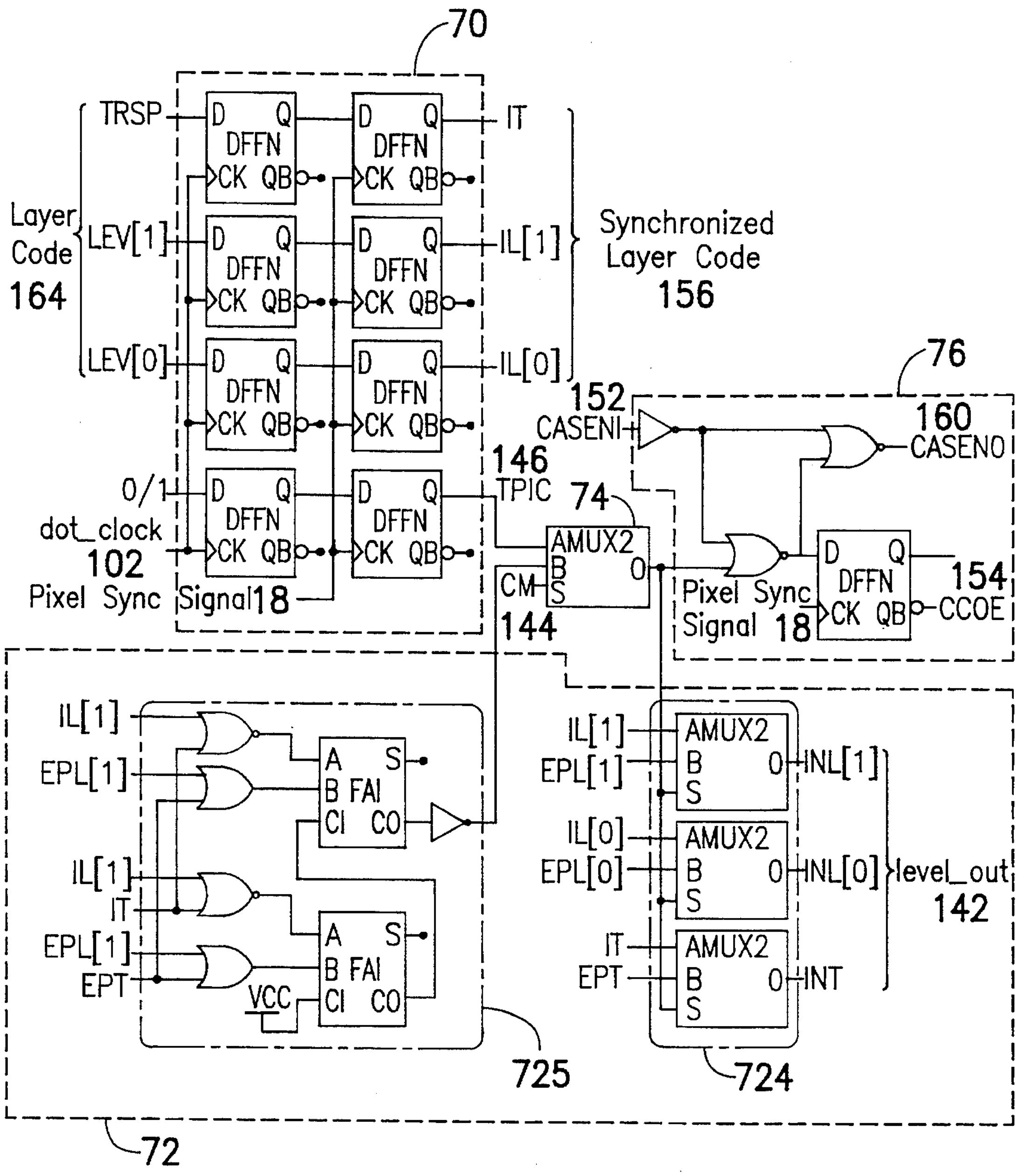
FIG. 7 is another schematic circuit diagram of the preferred embodiment according to this invention.

Because the layer codes contain layer information (i.e. L1 and L0) and transparency information (i.e. TSP), when it is transparent (TSP=1), the output 0[3:0]of decoder is zero; a comparator 723 for comparing layer the decoded data LL[3:0 ]with EL[3:0 ]; and a selector 724 for selecting a higher level layer codes then to output the level_out 142 consisting of INL[1], INL[1], INL[0], and INT. Referring to FIG. 7, in the layer comparator 72, a subtractor 725 may replace the decoders 721, 722, and comparator 723 in FIG. 6 for comparing by positive or negative signs.

Figure 8:
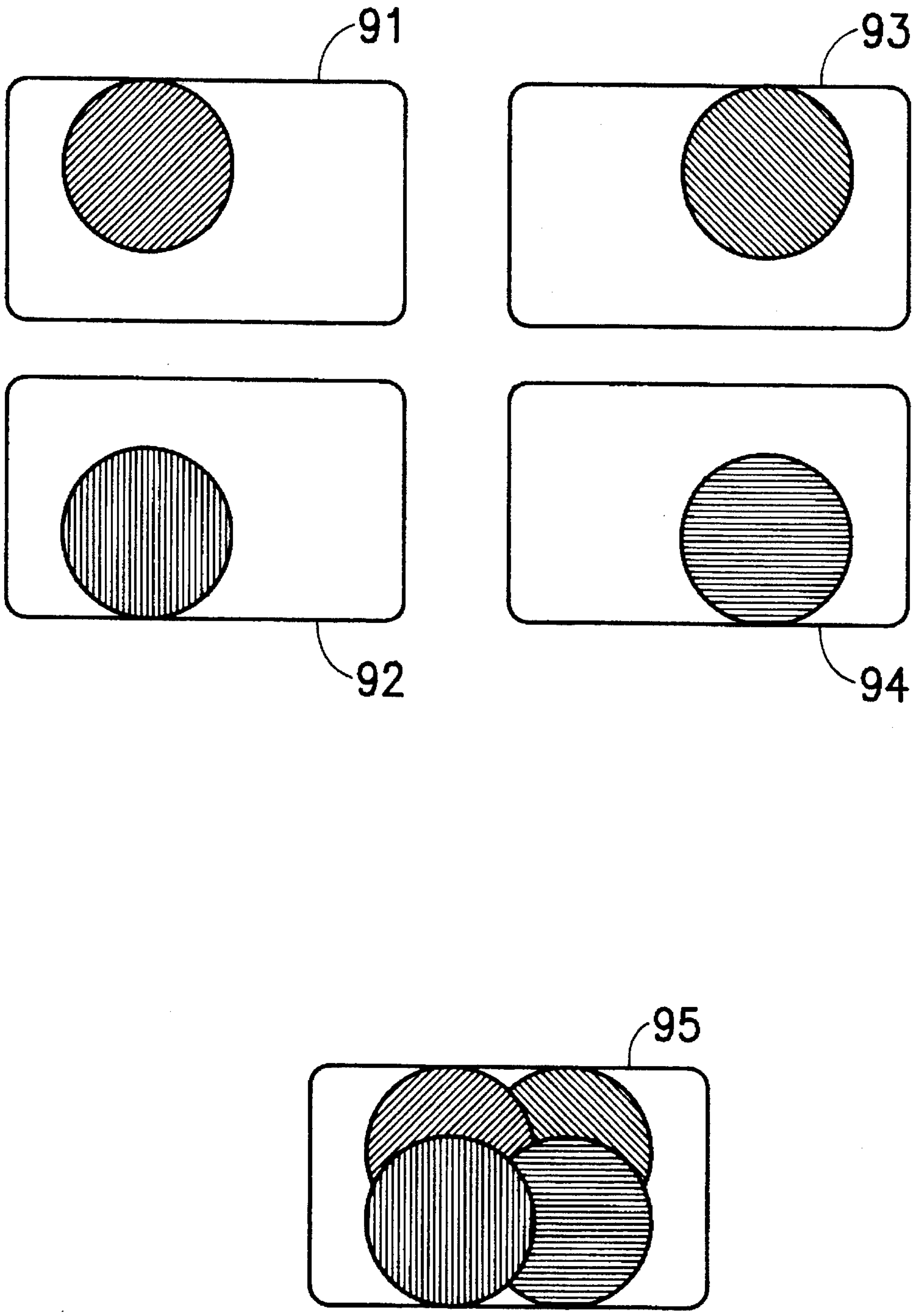
FIG. 8 shows a graphic display result using this invention.

Referring back to FIG. 6, the cascade controller 76 selects the mode output 150 from mode selector 74 and the layer comparison result CASENI 152 from previous graphic processor to control the output of color code 102, and CASEN1 152 of a certain graphic processor is the layer comparison result CASEN0 160 of the previous graphic processor thereof. The select signal CM 144 inputted to the mode selector 74 is utilized to control the cascaded structure depicted in FIG.1 for switching between two layer comparison modes. One approach is dominated by the level of the layer code, and another approach is dominated by the queuing order of those graphic processors, such as in a sequence of primary graphic processor 10, the first secondary graphic processor 20, the second secondary graphic processor 21, until the final one. The results of two cases are revealed in FIG. 8 and FIG. 9. FIG. 8 is based on the layer codes as the major graphic layer order. Also referring to FIG. 2, first graphic 91 and second graphic 92 are the computed results of graphic arithmetic unit 44. The layer code of first graphic 91 is 2. The layer code of second graphic 92 is 1. Third graphic 93 and fourth 94 are the computed results of graphic arithmetic unit 44. The layer code of third graphic 93 is 2. The layer code of fourth graphic 94 is 1.

Figure 9:
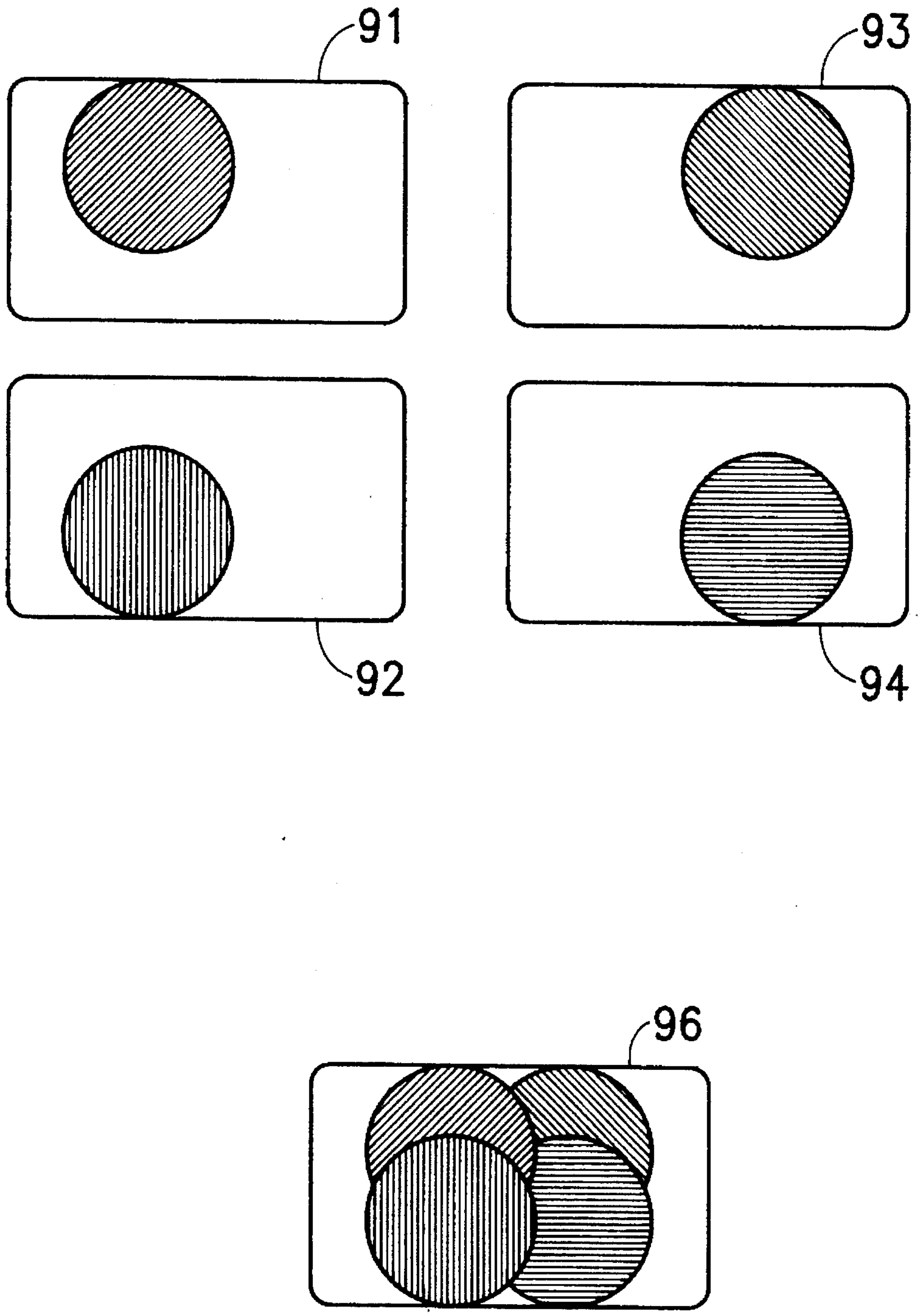
FIG. 9 shows an alternate graphic display result using this invention.

In FIG. 8, first layer graphic 95 is the result of layer order; the order is as follows: second graphic 92, fourth graphic 94, first graphic 91, and third graphic 93. In FIG. 9, second layer graphic 96 is the result of layer order; the order is as follows: second graphic 92, first graphic 91, fourth graphic 94, and third graphic 93.

As for the cascaded method, which is disclosed by this invention, includes the steps of:

(1) assigning one of a plurality of graphic processors as a primary graphic processor, the rest are secondary graphic processors. The primary graphic processor has to provide a pixel sync signal and a picture field sync signal to the secondary graphic processors;

(2) utilizing a cascaded layer code to do a comparison in an order which starts from the lowest level;

(3) using a cascade control signal to control the color code output order according to the result of the comparison; and (4) ensuring all output color codes of each graphic processor go to a common color code bus.

The invention has been described above in terms of some important, preferred embodiments; however, this invention is not limited to the disclosed embodiments. On the contrary, for a person skilled in the art, it is intended to cover various modifications and similar arrangements included within the spirit and scope of the appended claims, the scope of which should be accorded the broadest possible interpretation so as to encompass all such modifications and similar structures and processes.

What is claimed is:

1. An apparatus for cascading a primary graphic processor and at least one secondary graphic processor which generate color codes and layer codes, comprising:

a clock generator within each graphic processor which generates timing control and synchronization signals including a pixel sync signal and a picture field sync signal, wherein scan timing is synchronized between the graphic processors;

a pixel synchronizer which synchronizes the color code and layer code of the secondary graphic processor with the pixel sync signal from said clock generator of said primary graphic processor or an immediately preceding secondary graphic processor when it exists;

a layer comparator which compares a layer level of the layer code of a graphic processor outputted from said pixel synchronizer with a layer level of the layer code of an immediately following graphic processor when it exists to give a priority of layer with the higher level;

a cascade controller which determines whether to output the color codes according to the comparison of the layer levels from said layer comparator or the layer code from said pixel synchronizer; and a color code output device which controls the output of color codes according to the color codes from said pixel synchronizer, and being controlled by a controlling signal from said cascade controller.

2. The apparatus as claimed in claim 1, wherein said clock generator includes:

a time-base signal generator for generating a basic timing clock needed for graphic processing;

a horizontal counter for counting the time needed to complete a horizontal scan according to the basic timing clock and outputting horizontal counter data;

a horizontal decoder for receiving the horizontal counter data from said horizontal counter and converting the horizontal counter data into a horizontal control timing clock signal for synchronizing graphic processing and a horizontal period signal;

a vertical counter for counting the time needed to complete a vertical scan based on said horizontal period signal from said horizontal decoder and outputting vertical counter data;

a vertical decoder for receiving said vertical counter data from said vertical counter and converting the vertical counter data into a vertical control timing clock signal for synchronizing graphic processing and a vertical blanking signal; and a primary/secondary system synchronizer for controlling the output of the basic timing clock and vertical blanking signal.

3. The apparatus as claimed in claim 1, wherein said layer comparator includes:

two sets of decoders for decoding the layer codes of a graphic processor and the layer code of the immediately following graphic processor and outputting decoded layer codes;

a comparator for comparing the decoded layer codes; and a selector for selecting a decoded layer code of higher level and feeding back this layer code to the immediately preceding graphic processor for comparison.

4. The apparatus as claimed in claim 1, wherein said layer comparator includes:

a subtractor for subtracting the layer codes between two graphic processors; and a selector for selecting the higher level of layer codes for further comparison according to the subtracting result of said subtractor.

5. The apparatus as claimed in claim 1, further including a mode selector for receiving said layer codes from said pixel synchronizer and said layer comparator for selecting modes of overlaying graphic layers among different graphic processors.

6. The apparatus as claimed in claim 2, wherein said primary/secondary system synchronizer includes:

a pixel sync signal I/0 controller which is controlled by a primary/secondary system select signal to determine whether to output the clock signal generated by said time-base signal generator as the pixel sync signal or to input the pixel sync signal from said primary graphic processor;

a picture field sync signal I/0 controller which is controlled by the primary/secondary system select signal for determining whether to output a vertical blanking signal from said vertical decoder as the picture field sync signal or to input the picture field sync signal from said primary graphic processor; and a positive-edge detector triggered by the positive edge of said vertical blanking signal pulse for setting the initial values of said horizontal and vertical counters.

7. A method for enhancing graphic processing capability of a graphical apparatus by cascading a primary graphic processor and at least one secondary graphic processor which generate color codes and layer codes, said method comprising the steps of:

providing a plurality of graphic processors;

assigning one graphic processor as a primary graphic processor and the remaining graphic processors as secondary graphic processors, wherein said primary graphic processor supplies a pixel sync signal and a picture field sync signal to said secondary graphic processors;

using a cascaded layer code to compare the layer codes of the graphic processors;

outputting the compared result from the cascaded layer code;

using a cascaded control signal to control the output order of the color codes of each of the graphic processors based on the compared result; and sending the color codes of each graphic processor to a color code bus according to the output order.

8. The method as claimed in claim 7, wherein said color code is used to define a field of depth including picture layer information and transparency information.

9. The method as claimed in claim 7, wherein the step of using the cascaded layer code to compare the layer codes between graphic processors further includes a comparison of said cascaded layer codes starting from the graphic processors of the previous two levels, then supplying the layer codes of a level higher to the previous graphic processor for comparison.

10. The method as claimed in claim 7, wherein the step of using a cascaded control signal to control the color code output order further includes starting from the primary or an immediately preceding secondary processor to determine whether to output the color code according to the result of comparison.

11. An apparatus for cascading a primary graphic processor and at least one secondary graphic processor which generate color codes and layer codes, comprising:

means for generating timing control and synchronization signals including a pixel sync signal and a picture field sync signal, wherein scan timing is synchronized between the graphic processors;

means for synchronizing a color code and a layer code of the second graphic processor with the pixel sync signal from said generating means of said primary graphic processor or an immediately preceding secondary graphic processor when it exists;

means for comparing a layer level of the layer code of a graphic processor outputted from said synchronizing means with a layer level of the layer code of an immediately following graphic processor when it exists to give a priority of layer with the higher level;

means for determining whether to output the color codes according to the comparison of the layer levels from said comparing means or the layer code from said synchronizing means; and means for controlling the output of color codes according to the color codes from said synchronizing means, and being controlled by a controlling signal from said determining means.

12. The apparatus as claimed in claim 11, wherein said clock generator includes:

means for generating a basic timing clock needed for graphic processing;

means for counting the time needed to complete a horizontal scan according to the basic timing clock and outputting horizontal counter data;

means for receiving the horizontal counter data from said horizontal counter means and converting the horizontal counter data into a horizontal control timing clock signal for synchronizing graphic processing and a horizontal period signal;

means for counting the time needed to complete a vertical scan based on said horizontal period signal from said horizontal counter data receiving means and outputting vertical counter data;

means for receiving said vertical counter data from said vertical counter means and converting the vertical counter data into a vertical control timing clock signal for synchronizing graphic processing and a vertical blanking signal; and means for controlling the output of the basic timing clock and vertical blanking signal.

13. The apparatus as claimed in claim 11, wherein said layer comparator includes:

means for decoding the layer codes of a graphic processor and the layer code of the immediately following graphic processor, and outputting decoded layer codes;

means for comparing the decoded layer codes; and means for selecting a decoded layer code of higher level and feeding back this layer code to the immediately preceding graphic processor for comparison.

14. The apparatus as claimed in claim 11, wherein said layer comparator includes:

means for subtracting the layer codes between two graphic processors; and means for selecting the higher level of layer codes according to the subtracting result of said subtractor.

15. The apparatus as claimed in claim 11, further including means for receiving said layer codes from said synchronizer means and said comparator means for selecting modes of overlaying graphic layers among different graphic processors.

16. The apparatus as claimed in claim 12, wherein said controlling means includes:

pixel sync signal I/O controller means, which is controlled by a controlling means select signal, for determining whether to output the clock signal generated by said generating means as the pixel sync signal or to input the pixel sync signal from said primary graphic processor;

picture field sync signal I/O controller means, which is controlled by the controlling means select signal, for determining whether to output a vertical blanking signal from said vertical counter data receiving means as the picture field sync signal or to input the picture field sync signal from said primary graphic processor; and means, triggered by the positive edge of said vertical blanking signal pulse, for setting the initial values of said horizontal and vertical counters.

17. The apparatus of claim 1, wherein each said primary graphic processor and secondary graphic processor includes said clock generator, said pixel synchronizer, said layer comparator, said cascade controller and said color code output device.

18. The apparatus of claim 11, wherein each said primary graphic processor and secondary graphic processor includes said generating means, synchronizing means, comparing means, determining means and controlling means.

* * * * *